July 14, 1959
C. P. ORR
2,894,716
ENGINE PRIMING LINE ATTACHMENT FOR DASHBOARDS
Filed Sept. 28, 1955
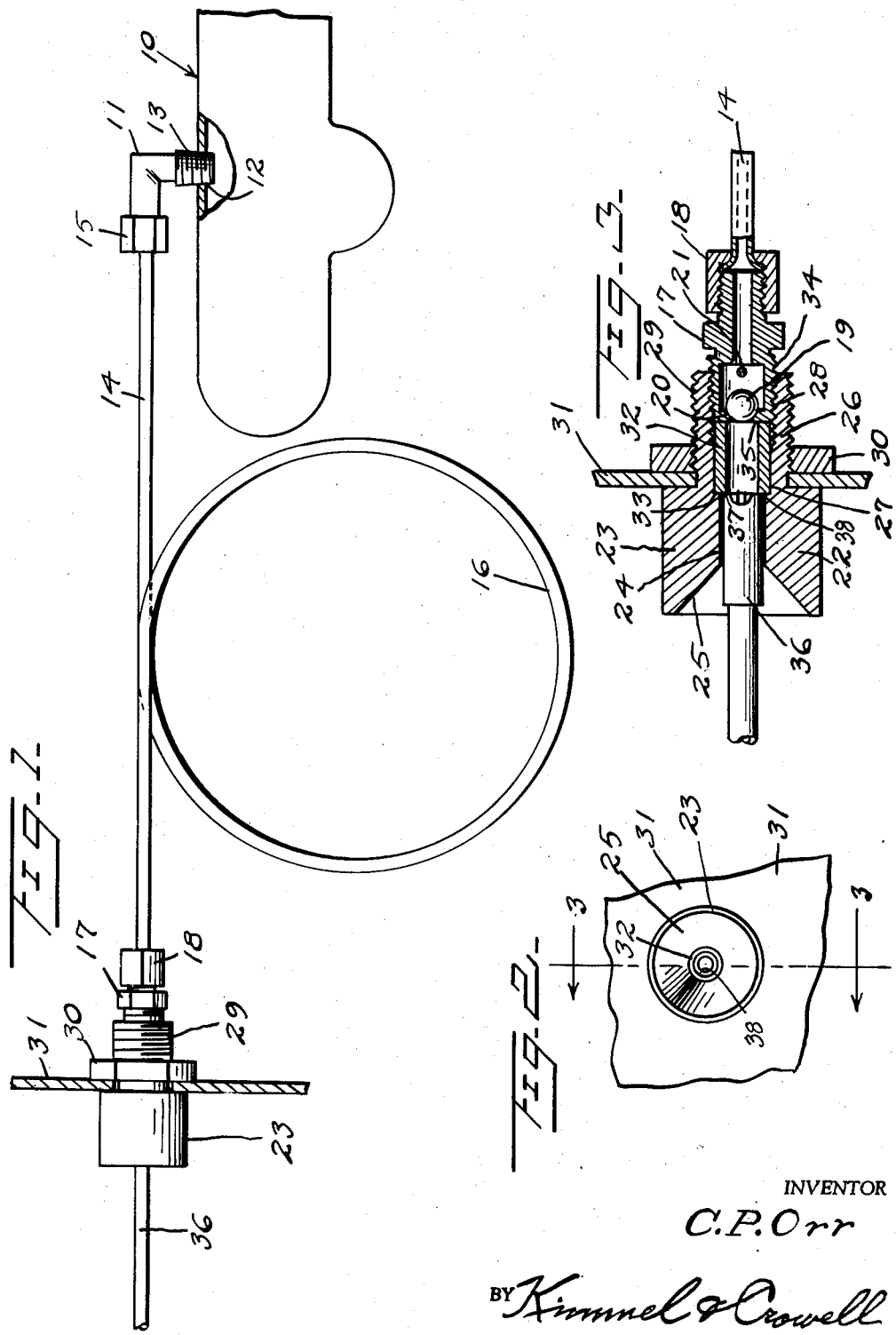
INVENTOR
C. P. Orr
BY Kimmel & Crowell
ATTORNEYS

2,894,716

ENGINE PRIMING LINE ATTACHMENT FOR DASHBOARDS

Charles P. Orr, Camden, N.J., assignor to Spray Products Corporation, Camden, N.J., a corporation of New Jersey Application September 28, 1955, Serial No. 537,188

2 Claims. (Cl. 251—148)

The present invention relates to engine priming lines which are adapted to be attached to the dashboard of a vehicle.

The primary object of the invention is to provide a priming line attached to the intake manifold of an engine and extending to the dashboard of a vehicle so that the engine can be primed with special starting fluid directly from the driver's seat.

Another object of the invention is to provide a priming line of the class described having means associated therewith for shutting off the line in case of backfire in the engine.

A further object of the invention is to provide a dashboard mounted priming line for internal combustion engines which is constructed to cooperate with my co-pending application for Fuel Atomizing Spray Device, Serial No. 522,199, filed July 15, 1955, so that the vehicle operator may provide the engine with starting fluid conveniently.

A still further object of the invention is to provide a priming line of the class described which will be inexpensive to manufacture, easy to install, and simple to use.

Other objects and advantages will become apparent in the following specification when considered in the light of the attached drawing, in which:

Figure 1 is a side elevation of the invention shown attached to a fragmentary portion of an intake manifold at one end and a fragmentary portion of a dashboard at the other end.

Figure 2 is a front elevation of the invention shown installed in a fragmentary portion of a dashboard.

Figure 3 is a longitudinal cross-section taken along the line 3—3 of Figure 2, looking in the direction of the arrows, with the nozzle from my fuel atomizing spray device shown in spraying position.

Referring now to the drawing in detail wherein like reference numerals indicate like parts throughout the several figures, the reference numeral 10 indicates generally an intake manifold of an internal combustion engine of either gasoline or diesel fuel character. An L-shaped fitting 11 is threadedly engaged into a threaded bore 12 in the intake manifold by means of threaded portion 13 on the fitting 11. A tube 14 is secured at one end to the fitting 11 by means of a nut 15 constructed in the conventional manner.

The tube 14 is provided with a loop 16 to permit relative movement between the opposite ends of the tube 14 without rupturing the tube. A fitting 17 is secured to the opposite end of the tube 14 by means of a nut 18 in the usual manner. The fitting 17 is provided with a ball check valve 19 which is adapted to seat against the valve seat 20 in the end of the fitting 17 opposite the nut 18. A pin 21 extends through the fitting 17 in the usual manner to prevent the ball 19 from seating in a direction to prevent flow into the tube 14 from the fitting 17.

A coupling 22 is provided with a body portion 23 having a bore 24 extending axially therethrough with the bore 24 having a conical mouth 25 at the end of the coupling 22 opposite the tubing 14. A boss 26 extends oppositely to the mouth 25 and is provided with a bore 27 in axial alignment with the bore 24 and larger than the bore 24. The outer end of the bore 27 is internally threaded as at 28 and the boss 26 is externally threaded as at 29.

A clamp nut 30 is adapted to be threadedly engaged on the external threads 29 of the boss 26 to clamp the coupling 22 to a dashboard 31 with the body portion 23 on the instrument side of the dashboard 31. A tubular seal 32 is positioned in the bore 27 and bears against a shoulder 33 between the bore 27 and the bore 24 at one end thereof and presents an annular inwardly extending shoulder 38.

The fitting 17 is provided with an externally screw threaded portion 34 which is adapted to be threadedly engaged with the threads 28 of the bore 27 with the end 35 of the fitting 17 engaging the seal 32 at the end thereof opposite the shoulder 33. A nozzle 36 of my fuel atomizing spray device is adapted to be positioned in the bore 24 with the inner end 37 thereof in engagement with the shoulder 38 formed by the seal 32 so as to prevent leakage.

In the use and operation of the invention illustrated in Figures 1, 2 and 3, the engine (not shown) to which the intake manifold 10 is attached is electrically cranked in the usual manner. Starting fluid is sprayed from the nozzle 36 through the tubing 14 to the intake manifold 10 to provide the engine wih a more volatile fuel, to permit the engine to be more readily started under conditions which would normally prevent the engine from starting on the normal fuel. In the event that the engine should backfire during the starting thereof or at any other time, the pressures resulting therefrom will be completely contained by the ball 19 engaging with the seat 20 in the fitting 17. Obviously, the ball 19 will move away from the seat 20 when starting fluid is being sprayed through the body 23.

Having thus described the preferred embodiment of the invention, it should be understood that numerous modifications and structural adaptations may be resorted to without departing from the scope of the appended claims.

What is claimed is:

1. A valve member for detachably connecting a conduit having a restricted terminal orifice therein to a second conduit comprising a coupling, said coupling having a conical bore extending axially therein from one end thereof and connected with a linearly extending passage including a first axial bore and a second axial bore of a diameter greater than said first axial bore extending from the other end of said coupling and connected with the first axial bore with the junctures of said axial bores forming a shoulder internally of said coupling, a check valve fitting secured at one end to said second conduit and at its opposite end to said coupling, a check valve in said fitting, and a tubular seal positioned in the larger diameter second axial bore in said coupling having one end engaging the shoulder at the junctures of said larger and smaller diameter bores in said coupling and the other end engaging in sealing relation said check valve fitting, said conical bore forming a mouth opening in said coupling providing a guiding and receiving opening for said orificed conduit in said coupling with the inner end of said orificed conduit establishing sealing engagement with the end of said seal adjacent the shoulder at the junctures of the larger and smaller diameter bores in said coupling.

2. A valve member for detachably connecting a conduit having a restricted terminal orifice therein to a second conduit as set forth in claim 1 in which said tubular seal provides an inwardly extending annular shoulder adjacent the junctures of the larger and smaller diameter bores in said coupling providing an annular seat for the inner end of said orificed conduit.

References Cited in the file of this patent

UNITED STATES PATENTS

| | | |
|---|---|---|
| 1,043,680 | Dowell | Nov. 5, 1912 |
| 1,685,408 | Murphy | Sept. 25, 1928 |
| 1,716,501 | Murphy | June 11, 1929 |
| 1,764,186 | Teesdale | June 17, 1930 |
| 2,000,091 | Moore | May 7, 1935 |
| 2,601,211 | Neely | June 17, 1952 |
| 2,708,922 | Neely | May 24, 1955 |
| 2,730,093 | Neely | Jan. 10, 1956 |

FOREIGN PATENTS

| | | |
|---|---|---|
| 164,599 | Great Britain | June 16, 1921 |